(12) United States Patent
Taya (10) Patent No.: US 10,396,572 B2
(45) Date of Patent: Aug. 27, 2019

(54) POWER TRANSMISSION DEVICE AND POWER TRANSMISSION METHOD

(71) Applicant: LAPIS Semiconductor Co., Ltd., Yokohama (JP)

(72) Inventor: Takashi Taya, Yokohama (JP)

(73) Assignee: LAPIS Semiconductor Co., Ltd., Yokohama (JP)

( * ) Notice: Subject to any disclaimer, the term of this patent is extended or adjusted under 35 U.S.C. 154(b) by 0 days.

(21) Appl. No.: 15/718,093

(22) Filed: Sep. 28, 2017

(65) Prior Publication Data

US 2018/0097379 A1     Apr. 5, 2018

(30) Foreign Application Priority Data

Oct. 5, 2016 (JP) .................. 2016-197287

(51) Int. Cl.
*H02J 7/02* (2016.01)
*H02J 7/00* (2006.01)
*H02J 50/10* (2016.01)

(52) U.S. Cl.
CPC .......... *H02J 7/0029* (2013.01); *H02J 7/0031* (2013.01); *H02J 7/0052* (2013.01); *H02J 7/025* (2013.01); *H02J 50/10* (2016.02)

(58) Field of Classification Search
CPC ...................................................... H02J 7/025

USPC ........................................................ 320/108
See application file for complete search history.

(56) References Cited

U.S. PATENT DOCUMENTS

2017/0338685 A1* 11/2017 Jung .................. H02J 7/0021

FOREIGN PATENT DOCUMENTS

| JP | 2008-206296 | * | 4/2008 | ............... H02J 7/00 |
| JP | 2008-206296 A | | 9/2008 | |
| JP | 2013-118719 A | | 6/2013 | |

* cited by examiner

*Primary Examiner* — Edward Tso
*Assistant Examiner* — Ahmed H Omar
(74) *Attorney, Agent, or Firm* — Rabin & Berdo, P.C.

(57) ABSTRACT

A power transmission device includes: a power reception unit that receives electric power from outside; a power transmission line that transmits the electric power received with the power reception unit to a battery; a transmission cut-off switch that cuts off the power transmission line, a transmission control circuit that uses the electric power received in the power reception unit as operation power, receives a battery state signal indicating a state of the battery, and switches conduction and non-conduction of the transmission cut-off switch on the basis of the battery state signal; and a cut-off control circuit that monitors the received electric power from the power reception unit by receiving electric power from the battery, and forcibly puts the transmission cut-off switch in a non-conductive state when the received electric power is less than a specified value.

7 Claims, 9 Drawing Sheets

POWER TRANSMISSION DEVICE AND POWER TRANSMISSION METHOD

BACKGROUND OF THE INVENTION

1. Field of the Invention

The present invention relates to a power transmission device and a power transmission method for transmitting electric power from a power transmitter to devices such as a battery.

2. Background Art

In recent years, a technique of charging the battery of electronic devices in a non-contact manner (without contact) is starting to spread, the electronic devices including smartphones, smart watches, wrist watches, and earphones that are electrically controlled. A technique of using so-called energy harvesting to provide a power source for charging a battery or to provide an operation power source for electronic devices is also being generalized. The energy harvesting may be defined as power generation using environmental energies, such as sunlight, heat, and vibration.

For example, Japanese Patent Application Laid-Open No. 2008-206296 discloses an electronic device including at least a loop-like conductive material that causes power generation through electromagnetic induction. Japanese Patent Application Laid-Open No. 2013-118719 discloses a battery-driven device that allows non-contact charging through electromagnetic coupling between a power supply coil on a charging stand side and an induction coil of the battery driven device.

SUMMARY OF THE INVENTION

It can be said that the non-contact power transmission and the power transmission by energy harvesting are power transmission schemes with a considerably enhanced convenience as compared with the contact-type power transmission. However, these power transmission schemes have problems that a power transmitting side that is a transmission source may have unstable electric power and that a power receiving side may receive electric power at unexpected timing.

For example, in the case of non-contact power transmission, unstable power reception may occur at unexpected timing due to the influence of magnetic field generated from appliances such as microwave ovens and IH cookers even though power reception is not performed. In energy harvesting, the amount of received solar light may vary due to change in weather or other factors, which may destabilize power generation voltage (power reception voltage). In these cases, a battery charging state may become unstable, electric power may uselessly be consumed due to backflow of current from the battery, or device operation may become unstable.

Not only in the non-contact power transmission but also in the contact-type power transmission, the charging state of the battery and the operating state of the devices may become unstable when power transmission is destabilized due to connection failure such as disconnection.

The present invention has been made in view of the above-stated points, and therefore one of the objects of the present invention is to provide a power transmission device and a power transmission method capable of reliably cutting off a power transmission line when no electric power is received or when unstable power reception is performed.

A power transmission device according to the present invention includes: a power reception unit for receiving electric power from outside; a power transmission line for transmitting the electric power received with the power reception unit to a battery; a transmission cut-off switch for cutting off the power transmission line; a transmission control circuit configured to use the electric power received in the power reception unit as operation power, the transmission control circuit receiving a battery state signal indicating a state of the battery and switching conduction and non-conduction of the transmission cut-off switch on a basis of the battery state signal; and a cut-off control circuit for monitoring the received electric power from the power reception unit by receiving electric power supply from the battery, and for forcibly putting the transmission cut-off switch in a non-conductive state when the received electric power is less than a specified value.

A power transmission method according to the present invention is a power transmission method for transmitting to a battery electric power received from outside with a power reception unit. The method includes the steps of: switching connection and disconnection between the power reception unit and the battery to control power transmission to the battery; and forcibly disconnecting between the power reception unit and the battery when the received electric power from the power reception unit is less than a specified value.

The power transmission device according to the present invention forcibly cuts off a power transmission line to a battery regardless of the control state provided by other control means, when received electric power from a power reception unit is less than a specified value. A cut-off control circuit that performs the cut-off operation is driven by the battery. Therefore, in the state of receiving no electric power or in the state of unstable power reception, the power transmission line can reliably be cut off, so that useless power consumption caused by backflow of current from the battery can be suppressed.

DETAILED DESCRIPTION OF THE INVENTION

Embodiments of the present invention will be described below in detail.

First Embodiment

Figure 1:
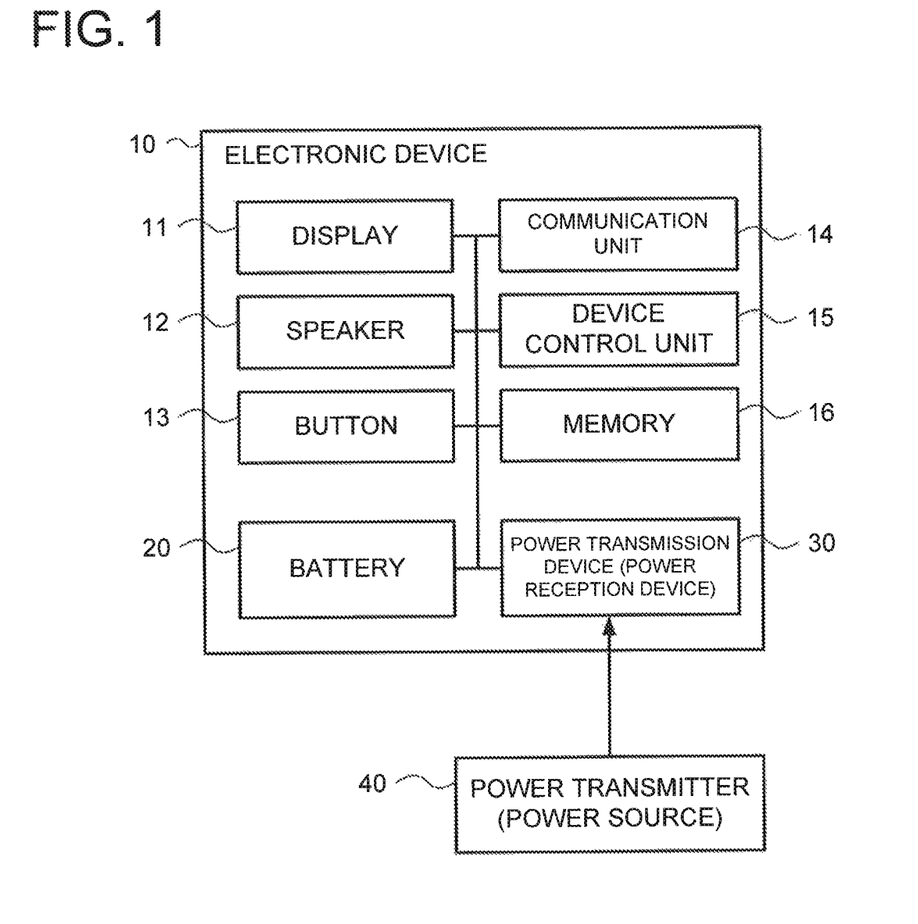
FIG. 1 is a block diagram illustrating a configuration of an electronic device including a power transmission device according to a first embodiment.

FIG. 1 is a block diagram illustrating a configuration of an electronic device 10 having a power transmission device 30 according to the first embodiment mounted as a power reception unit. In the present embodiment, the electronic device 10 is a mobile terminal, such as a smartwatch and a smartphone. For example, in the present embodiment, the electronic device 10 has a touch panel display 11, a speaker 12, and a button 13 as user interfaces. The electronic device 10 has a communication unit 14 that communicates with the outside, a device control unit 15 that performs various kinds of computation and performs operation control of component members such as the user interfaces, and a memory 16 that stores various kinds of I/O information and computation information. The device control unit 15 is a microcomputer, for example.

In the present embodiment, the electronic device 10 has a battery 20 used as an operation power source of the electronic device 10, and a power transmission device 30. The power transmission device 30 receives electric power from an external power transmitter (external power source) 40 in a non-contact manner, and transmits the electric power to the battery 20. For example, the power transmitter 40 has a coil antenna that generates an alternating current (AC) magnetic field of, for example, 13.56 MHz. The power transmission device 30 converts the AC magnetic field into electric power and performs power receiving operation. The power transmission device 30 transmits the received electric power to the battery 20, while supplying the electric power to other units in the electronic device 10. In other words, in the present embodiment, the power transmission device 30 is a wireless feeder device.

Figure 2:
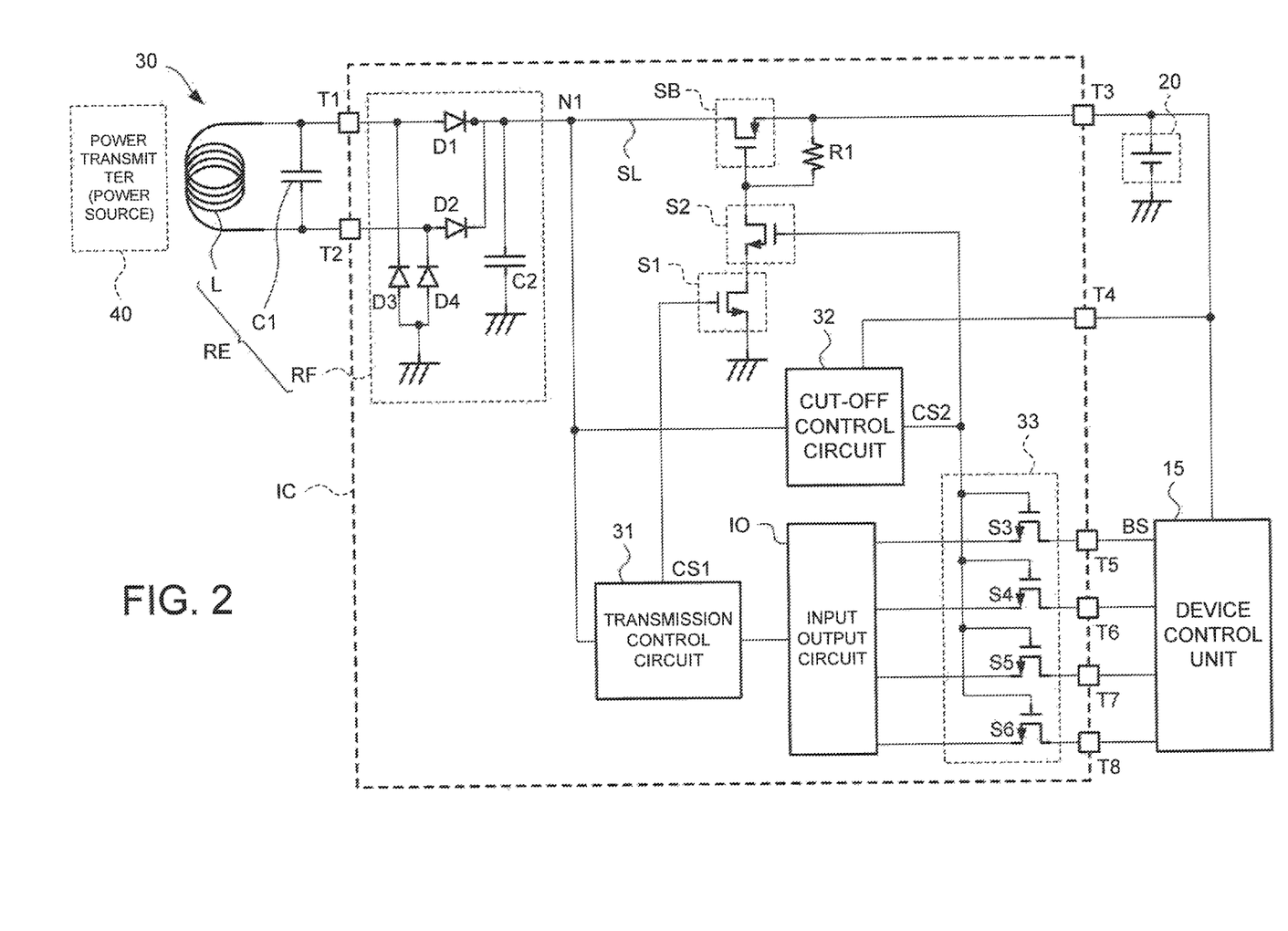
FIG. 2 is a circuit diagram illustrating the configuration of the power transmission device according to the first embodiment.

FIG. 2 is a circuit diagram illustrating the configuration of the power transmission device 30. The power transmission device 30 has a power reception unit RE that receives electric power from the outside. In the present embodiment, the power reception unit RE has a coil L that receives the AC magnetic field from the power transmitter 40, a capacitor C1 connected across the coil L, and a rectifier circuit RF connected across the capacitor C1. The power reception unit RE converts the AC magnetic field into an alternating current with the coil L and the capacitor C1, and converts the alternating current into a direct current (DC) voltage (electric power) with the rectifier circuit RF.

In the present embodiment, the rectifier circuit RF is integrated into the integrated circuit IC, while the coil L and the capacitor C1 are connected to the integrated circuit IC as external components of the integrated circuit IC. The integrated circuit IC has power reception terminals T1 and T2 connected to both the ends of the capacitor C1.

As illustrated in FIG. 2, the rectifier circuit RF has diodes D1 and D2 having anode terminals connected to the power reception terminals T1 and T2, respectively. The rectifier circuit RF also has diodes D3 and D4 having cathode terminals connected to the anode terminals of the diodes D1 and D2, respectively. The rectifier circuit RF also has a capacitor C2 having one end connected to cathode terminals of the diodes D1 and D2. The anode terminals of the diodes D3 and D4 and the other end of the capacitor C2 are grounded.

The power transmission device 30 also has a power transmission line (simply referred to as a transmission line hereinbelow) SL that transmits electric power from the power reception unit RE to the battery 20, and a transmission cut-off switch SB that switches connection and disconnection (cut-off) of the transmission line SL. Specifically, in the integrated circuit IC, a power transmission terminal (referred to as a feed terminal hereinbelow) T3 connected to one end (positive terminal) of the battery 20 is provided. The power reception unit RE is connected to the feed terminal T3 through the transmission line SL.

In the present embodiment, the transmission line SL is a wiring line between an output node N1 of the power reception unit RE and the feed terminal T3 in the integrated circuit IC. The transmission cut-off switch SB is a P-channel MOSFET having a source and a drain connected to the transmission line SL. A resistor R1 is connected between the source and a gate of the P-channel MOSFET as the transmission cut-off switch SB.

The power transmission device 30 has a transmission control circuit 31 that operates using the electric power received in the power reception unit RE as operation power. The transmission control circuit 31 switches conduction and non-conduction of the transmission cut-off switch SB based on the state (for example, a charging voltage) of the battery 20. In the present embodiment, the transmission control circuit 31 receives a battery state signal BS indicating the state of the battery 20 from the device control unit 15, and switches conduction and non-conduction of the transmission cut-off switch SB (i.e., whether or not to cut off the transmission line SL) on the basis of the battery state signal BS. The transmission control circuit 31 is a microcomputer, for example.

The power reception unit RE may have a regulator (not illustrated) that steps up and down the output voltage from the rectifier circuit RF. That is, the power reception unit RE may output a voltage whose voltage level or the like is regulated in accordance with the specification of the battery 20, for example. In this case, the transmission control circuit 31 may perform operation control of the regulator. For example, the transmission control circuit 31 can output to the power reception unit RE a signal for regulating the voltage level of the voltage, which is output as a power reception voltage inside the power reception unit RE, on the basis of the battery state signal BS.

The power transmission device 30 has a cut-off control circuit 32 that switches conduction and non-conduction of the transmission cut-off switch SB by receiving electric power supply from the battery 20. First, in the present embodiment, the cut-off control circuit 32 is connected to the battery 20 through a power source terminal T4. The cut-off control circuit 32 monitors the received electric power from the power reception unit RE. When the received electric power is less than a specified value, the cut-off control circuit 32 forcibly puts the transmission cut-off switch SB in a non-conductive state.

That is, in the present embodiment, the case where the received electric power is less than the specified value includes the state of receiving no electric power, i.e., the case where no power reception is performed. In these cases, the transmission cut-off switch SB is put in a non-conductive state by the cut-off control circuit 32 that is receiving electric power supply from the battery 20, the cut-off control circuit 32 having priority in switching of the transmission cut-off switch SB over the transmission control circuit 31.

For example, as illustrated in FIG. 2, the power transmission device 30 has a control switch (first control switch) S1 that switches conduction and non-conduction of the transmission cut-off switch SB, and a control switch (second control switch) S2 connected to the control switch S1 in series. The transmission control circuit 31 and the cut-off control circuit 32 generate and output control signals CS1 and CS2 that switch conduction and non-conduction of the control switches S1 and S2, respectively. The transmission control circuit 31 and the cut-off control circuit 32 switches conduction and non-conduction of the control switches S1 and S2 so as to switch conduction and non-conduction of the transmission cut-off switch SB, that is, connection and disconnection between the power reception unit RE and the battery 20.

In the present embodiment, the gate of the P-channel MOSFET as the transmission cut-off switch SB is connected in series to two N-channel MOSFETs serving as the control switches S1 and S2. In the present embodiment, a source of the N-channel MOSFET as the control switch S1 is grounded. The control switches S1 and S2 may be connected in any order. For example, the control switches S1 and S2 may be connected in series so that one end of the control switch S2 is grounded.

An input terminal of the transmission control circuit 31 is connected to an output node N1 of the power reception unit RE in the transmission line SL, while an output terminal is connected to a control terminal of the control switch S1 (a gate of the N-channel MOSFET). An input terminal of the cut-off control circuit 32 is connected to the output node N1 of the power reception unit RE, while an output terminal is connected to a control terminal (gate of an N-channel MOSFET) of the switch S2.

In the present embodiment, the transmission control circuit 31 is connected to the device control unit 15 of the electronic device 10. Specifically, the power transmission device 30 has interface terminals T5, T6, T7, and T8 in the integrated circuit IC, the interface terminals connecting between the transmission control circuit 31 and the device control unit 15 (external circuit). The transmission control circuit 31 is connected to the interface terminals T5 to T8 via the input/output circuit IO. In the present embodiment, the power transmission device 30 has an interface blocking circuit 33 between the input/output circuit IO (transmission control circuit 31) and the interface terminals T5 to T8 (device control unit 15).

In the present embodiment, the device control unit 15 is connected to the battery 20 and transmits to the transmission control circuit 31 a battery state signal BS indicative of charging specifications (capacity and permissible charging voltage) of the battery 20, the charging state of the battery 20, and the like. The transmission control circuit 31 performs control to execute power transmission on the basis of the received state signal BS of the battery 20. For example, the battery state signal BS is transmitted from the device control unit 15 to the transmission control circuit 31 through the interface terminal T5. The transmission control circuit 31 transmits to the device control unit 15 a signal including information used for outputting a power transmission status and the like to the outside (e.g., used for displaying on a display 11).

Input and output of these signals between the transmission control circuit 31 and the device control unit 15 are performed through the interface terminals T5 to T8 via the input/output circuit IO. The interface blocking circuit 33 is comprised of interface blocking switches S3, S4, S5, and S6 provided between the interface terminals T5, T6, T7, and T8 and the input/output circuit IO, respectively. In the present embodiment, the interface blocking switches S3 to S6 are each an N-channel MOSFET having a drain and a source provided between each of the interface terminals T5, T6, T7, and T8 and the input/output circuit IO.

In the present embodiment, the cut-off control circuit 32 generates the control signal CS2 that puts the interface blocking switches S3 to S6 in a non-conductive state, when the received electric power is less than the specified value. The cut-off control circuit 32 outputs the control signal CS2 to the control terminals (gates of the N-channel MOSFETs) of the interface blocking switches S3 to S6.

Figure 3A:
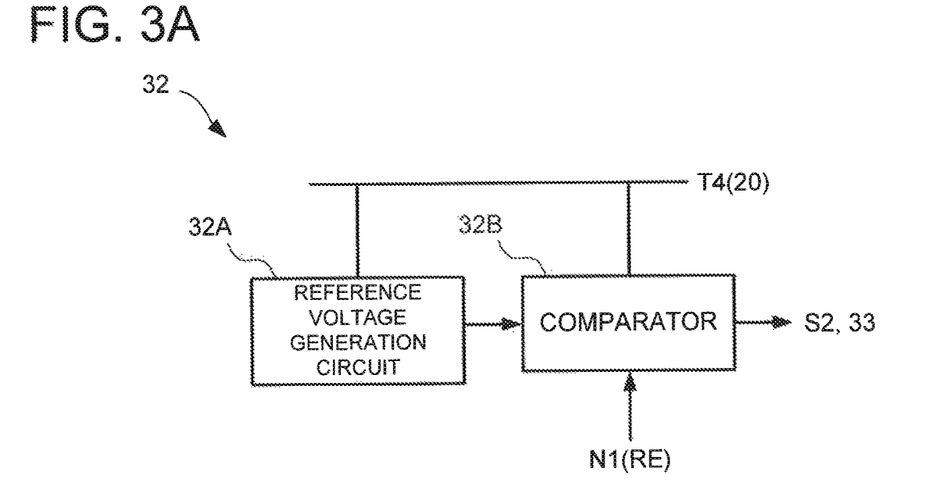
FIG. 3A is a block diagram illustrating a configuration of a cut-off control circuit of the power transmission device according to the first embodiment.
Figure 3B:
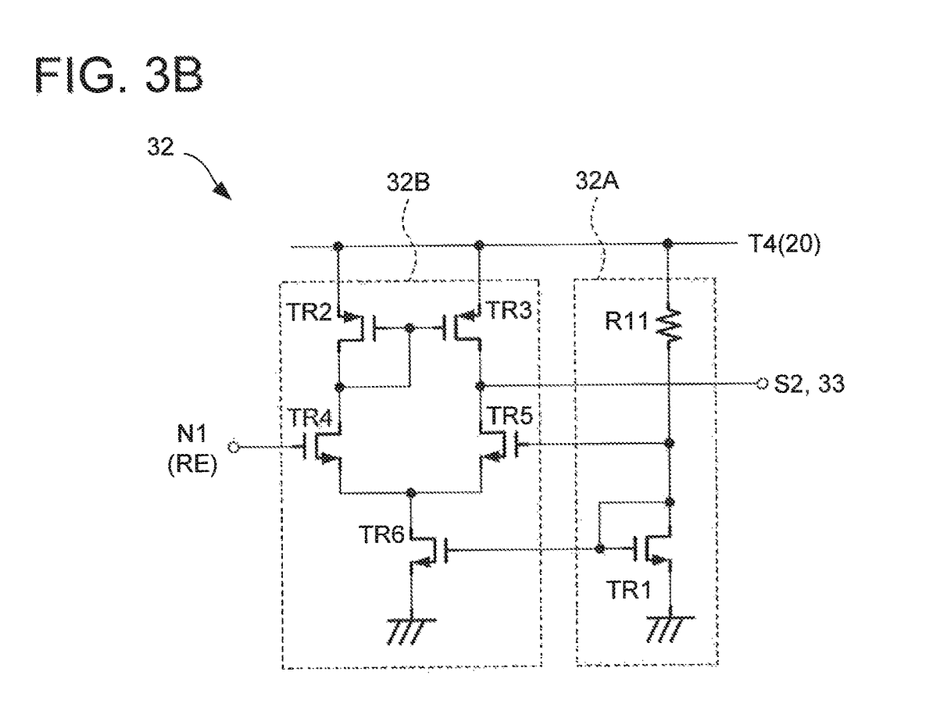
FIG. 3B is a circuit diagram illustrating an example of the configuration of the cut-off control circuit.

FIG. 3A is a block diagram illustrating the configuration of the cut-off control circuit 32, and FIG. 3B is a circuit diagram illustrating an example of the configuration. The cut-off control circuit 32 has a reference voltage generation circuit 32A that generates a reference voltage, and a comparator 32B that compares a voltage received from the power reception unit RE with the reference voltage. The cut-off control circuit 32 supplies a signal indicative of a comparison result by the comparator 32B as the control signal CS2 to the switch S2. As illustrated in FIG. 3A, the reference voltage generation circuit 32A and the comparator 32B operate by receiving electric power supply from the battery 20.

FIG. 3B illustrates an example of the configuration of the reference voltage generation circuit 32A and the comparator 32B. The reference voltage generation circuit 32A is comprised of a resistor R11 having one end connected to the battery 20 through the power source terminal T4, and a transistor TR1 connected to the other end of the resistor R11. In the present embodiment, the transistor TR1 is an N-channel MOSFET having a drain and a gate connected to the other end of the resistor R11, and a source being grounded.

The comparator 32B is comprised of transistors TR2 and TR3 connected to the battery 20, transistors TR4 and TR5 connected to the transistors TR2 and TR3, and a transistor TR6 connected to the transistors TR4 and TR5. In the present embodiment, the transistors TR2 and TR3 are each a P-channel MOSFET. The transistors TR4 to TR6 are each an N-channel MOSFET. The source of the transistor TR6 is grounded.

As illustrated in FIG. 3B, a connecting end between the resistor R11 and the drain of the transistor TR1 is connected to a gate of the transistor TR5 in the comparator 32B. The gate of the transistor TR1 is connected to a gate of the transistor TR6 in the comparator 32B. A gate of the transistor TR4 in the comparator 32B is connected to the power reception unit RE. A connecting end between a source of the transistor TR3 and a drain of the transistor TR5 is connected to the control switch S2 and the interface blocking circuit 33.

Figure 4:
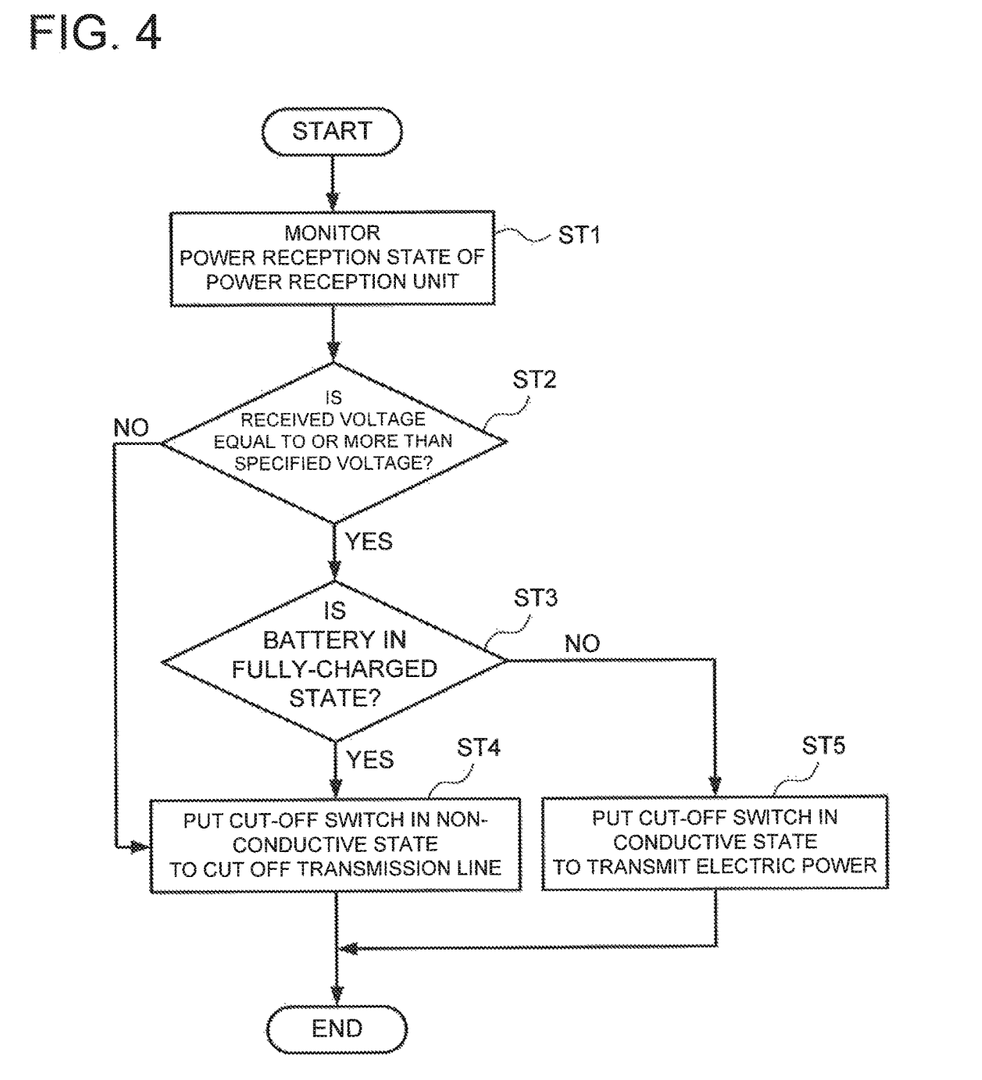
FIG. 4 is a flow chart illustrating a power transmission control flow of the power transmission device according to the first embodiment.

FIG. 4 is a flow chart illustrating one example of a power transmission flow of the power transmission device 30 controlled by the transmission control circuit 31 and the cut-off control circuit 32. First, the cut-off control circuit 32 receives electric power supply from the battery 20, and monitors the state (received voltage in the present embodiment) of receiving electric power from the outside by the power reception unit RE (step ST1).

Next, the cut-off control circuit 32 determines whether or not the voltage received by the power reception unit RE is a specified voltage or more (step ST2). Specifically, the cut-off control circuit 32 uses the reference voltage generation circuit 32A to generate a reference voltage, and uses the comparator 32B to compare the reference voltage with the received voltage. In the present embodiment, when it is determined that the received voltage is the specified voltage or more, the cut-off control circuit 32 puts the control switch S2 in a conductive state.

Next, in the present embodiment, the transmission control circuit 31 determines whether or not the battery 20 is in a fully-charged state or in a state considered to be fully charged (step ST3). Specifically, the transmission control circuit 31 receives from the device control unit 15 the battery state signal BS indicating information such as the charging state and the specifications of the battery 20, and determines whether or not the battery 20 is in a fully-charged state. When determining that the battery 20 is in a fully-charged state, the transmission control circuit 31 puts the control switch S1 in a non-conductive state so as to put the transmission cut-off switch SB in a non-conductive state (step ST4). As a result, the transmission line SL is cut off, and connection between the power reception unit RE and the battery 20 is disconnected.

When determining that the received voltage of the power reception unit RE is less than the specified voltage, the cut-off control circuit 32 puts the control switch S2 in a non-conductive state so as to put the transmission cut-off switch SB in a non-conductive state (proceeds to step ST4). The above case corresponds to unexpected power reception. The unexpected power reception includes, for example, the case where the power reception unit RE receives the magnetic field generated due to outside environments other than the power transmitter 40, and the case where the power reception unit RE is in the state of receiving no electric power where no power reception is performed.

In step ST2, the cut-off control circuit 32 uses the reference voltage generation circuit 32A that generates a reference voltage by receiving electric power supply from the battery 20 and the comparator 32B that compares the reference voltage with the received voltage from the power reception unit RE to determine whether or not the received electric power from the power reception unit RE is less than the specified value.

When determining that the voltage equal to or more than the specified voltage is received and that the battery 20 is not fully-charged, the transmission control circuit 31 puts the control switch S1 in a conductive state. As a consequence, both the control switches S1 and S2 are put in a conductive state, so that the transmission cut-off switch SB is put in a conductive state (step ST5). Therefore, the power reception unit RE and the battery 20 are connected, so that the electric power from the power reception unit RE is transmitted to the battery 20 (the battery 20 is charged). The above case corresponds to the case where, for example, the electronic device 10 is properly connected to (disposed at) the power transmitter 40 and receives electric power from the power transmitter 40.

Thus, the power transmission device 30 controls power transmission by using the transmission control circuit 31 that operates by receiving electric power supply from the power reception unit RE, and the cut-off control circuit 32 that operates by receiving electric power supply from the battery 20. When the battery 20 is charged with voltage at least high enough to operate the cut-off control circuit 32, the cut-off control circuit 32 can monitor the power reception state of the power reception unit RE, and can forcibly cut off (put in a non-conductive state) the transmission cut-off switch SB (transmission line SL).

When the power reception unit RE is not receiving electric power, or the power reception unit RE does not receive sufficient electric power (i.e., when the power reception unit RE unexpectedly receives electric power), it is assumed that the transmission control circuit 31 that uses the electric power from the power reception unit RE as operation power may exhibit unstable operation. If the cut-off control circuit 32 and the control switch S2 are not provided, conduction and non-conduction of the control switch S1 becomes unstable, which causes the transmission cut-off switch SB to be unstably put in a conductive/non-conductive state. In this case, current may flow backward from the battery 20 toward the power reception unit RE through the transmission line SL suddenly put in a connected state, which may cause the battery 20 to consume electric power in vain.

However, in the present embodiment, the cut-off control circuit 32 receives electric power supply from the battery 20, and forcibly puts the transmission cut-off switch SB in a non-conductive state regardless of the state of the transmission cut-off switch SB switched by the transmission control circuit 31. Therefore, the cut-off control circuit 32 determinately puts the transmission cut-off switch SB in a non-conductive state independently of the transmission control circuit 31, and thereby cuts off the transmission line SL in a reliable manner. This makes it possible to provide the power transmission device 30 capable of reliably cutting off the transmission line SL when no electric power is received or when electric power is received unstably.

It is also possible to provide a power transmission method capable of reliably preventing an unstable power transmission state by performing the aforementioned steps ST4 and ST5 by using the transmission control circuit 31 and the cut-off control circuit 32, for example. More specifically, the present invention can be implemented as the power transmission method including, for example, the steps of switching connection and disconnection between the power reception unit RE and the battery 20 to control power transmission to the battery 20, and forcibly disconnecting between the power reception unit RE and the battery 20 when the received electric power from the power reception unit RE is less than a specified value.

Appliances such as smartwatches, wrist watches, and earphones consume less electric power (operation power) than other electronic devices. Accordingly, an influence of the power consumption due to backflow of current from the battery 20 is larger than that of other electronic devices. Therefore, it is preferable to mount the power transmission device 30 on these appliances to reliably cut off the transmission line SL to prevent backflow of current at the time of unstable power reception.

For example, when the power transmission device 30 is mounted on a wrist watch as the electronic device 10, the cut-off control circuit 32 is preferably configured such that component members (for example, the transmission control circuit 31 and the cut-off control circuit 32) other than the coil L and the capacitor C1 of the power reception unit RE are integrated in the integrated circuit IC, and are connected to a transistor as illustrated in FIG. 3B. In this configuration, the power consumption as the entire device can be reduced, and the operating voltage of the cut-off control circuit 32 can also be lowered.

When the battery 20 is not charged at all, that is, when no voltage is generated in the battery 20, operation of the cut-off control circuit 32 may become unstable. In this case, however, the battery 20 is in an uncharged state, and therefore backflow of current from the battery 20 does not occur. When the voltage equal to or more than the specified voltage is received in the state where the battery 20 is not charged at all, the MOSFET as the transmission cut-off switch SB serves as a parasitic diode, which causes current to flow toward the battery 20. Therefore, power transmission to the battery 20 is performed until operation of the transmission control circuit 31 or the cut-off control circuit 32 is stabilized.

In the present embodiment described in the foregoing, the transmission control circuit 31 performs switching control of the transmission cut-off switch SB on the basis of whether or not the battery 20 is in a fully-charged state. The control switch S1 operated by the transmission control circuit 31 may be switched on the basis of not only the charging state of the battery 20 but also other conditions. For example, the transmission control circuit 31 may receive information such as temperature and charging time of the battery 20 in the form of the battery state signal BS from the device control unit 15, and may perform switching control of the transmission cut-off switch SB on the basis of the information such as the temperature and the charging time of the battery 20.

Furthermore, in the present embodiment, when the voltage less than the specified voltage is received, the cut-off control circuit 32 supplies to the interface blocking circuit 33 (interface blocking switches S3 to S6) a signal for cutting off the interface of the transmission control circuit 31 with the device control unit 15. When no electric power is received or when electric power is received unstably, the operation of the transmission control circuit 31 becomes unstable. As a result, signals input and output by the input/output circuit IO may become unstable. For example, the signals input and output by the input/output circuit IO may unexpectedly be pulled up or pulled down, which may hinder transmission and reception of a desired signal. As a result, the information such as the charging specifications and the charging state of the battery 20 may inaccurately be fed to the transmission control circuit 31.

However, in the present embodiment, when reception of electric power becomes unstable, the cut-off control circuit 32 blocks the interface of the transmission control circuit 31 with the outside (puts the interface blocking switches S3 to S6 in a non-conductive state). Therefore, unstable input/output of signals of the transmission control circuit 31 to/from the outside is suppressed, so that unstable input/output operation of signals and unstable power transmission state are prevented.

Figure 5:
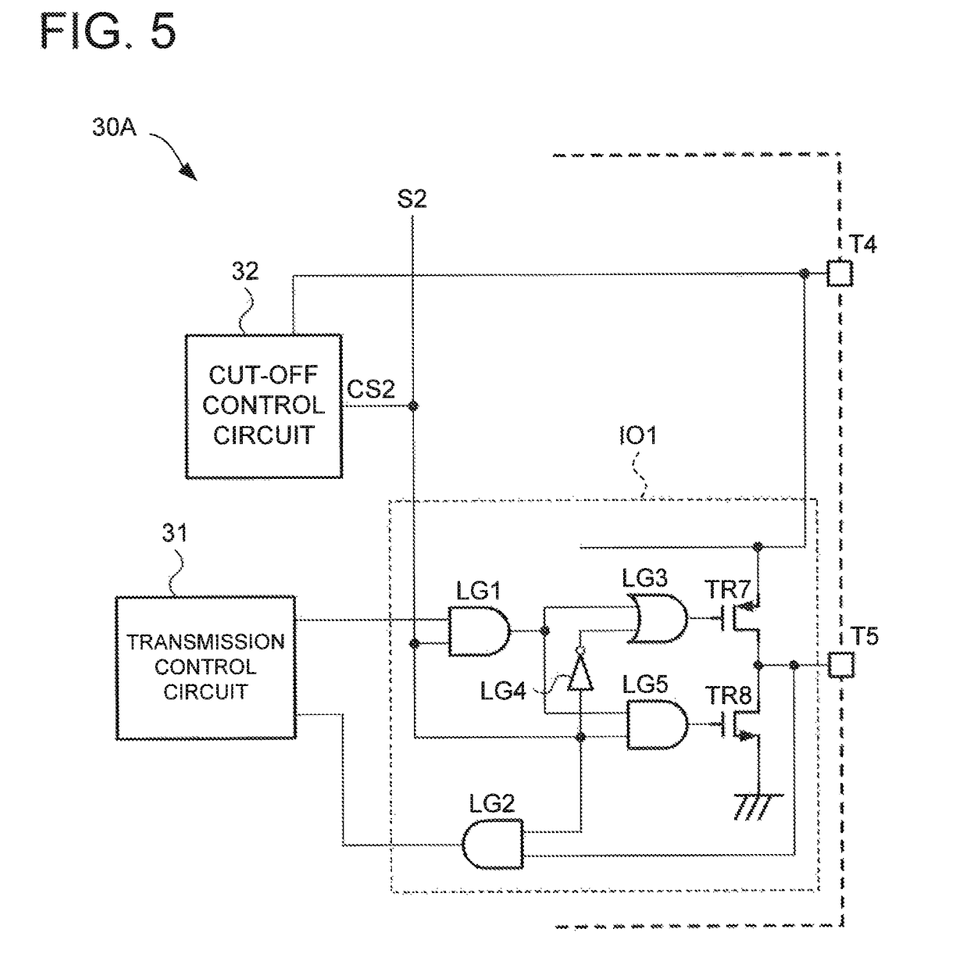
FIG. 5 is a circuit diagram illustrating a configuration of an interface blocking circuit in the power transmission device according to a modified example of the first embodiment.

FIG. 5 is a circuit diagram illustrating a configuration of a power transmission device 30A according to a modified example of the first embodiment. The power transmission device 30A is similar in configuration to the power transmission device 30 except the configuration of an input/output circuit IO1. In FIG. 5, a circuit diagram of the input/output circuit IO1 in the power transmission device 30A is illustrated, while some of other component members are omitted. FIG. 5 illustrates only an input/output circuit portion that is connected to the interface terminal T5 in the input/output circuit IO1. In the present modified example, the input/output circuit IO1 corresponds to another example of the configuration of the input/output circuit IO and the interface blocking switch S3 in the power transmission device 30.

The input/output circuit IO1 is comprised of AND circuits LG1 and LG2, an OR circuit LG3, a NOT circuit LG4, an AND circuit LG5, and transistors TR7 and TR8. In the present modified example, the transistor TR7 is a P-channel MOSFET and the transistor TR8 is an N-channel MOSFET.

The AND circuit LG1 has input terminals connected to an output terminal of the transmission control circuit 31 and an output terminal of the cut-off control circuit 32. The AND circuit LG1 has an output terminal connected to an input terminal of the OR circuit LG3. The AND circuit LG2 has input terminals connected to the interface terminal T5 and the output terminal of the cut-off control circuit 32. The AND circuit LG2 has an output terminal connected to an input terminal of the transmission control circuit 31.

The NOT circuit LG4 has an input terminal connected to the output terminal of the cut-off control circuit 32. The NOT circuit LG4 has an output terminal connected to an input terminal of the OR circuit LG3. The OR circuit LG3 has an output terminal connected to a gate of the transistor TR7. The AND circuit LG5 has input terminals connected to an output terminal of the AND circuit LG1 and the output terminal of the cut-off control circuit 32. The AND circuit LG5 has an output terminal connected to a gate of the transistor TR8. The transistor TR7 has a source connected to the power source terminal T4 (battery 20). The transistor TR7 has a drain connected to the interface terminal T5 and a source of the transistor TR8. The transistor TR8 has a drain being grounded.

In the present modified example, when an output signal (control signal CS2) of the cut-off control circuit 32 is at an L level (i.e., when received voltage is less than the specified voltage), the transistors TR7 and TR8 are put in a non-conductive state, and the interface with the device control unit 15 is blocked. Therefore, even when the input signal from the interface terminal T5 becomes unstable, a logical state is determined inside the input/output circuit IO1. Even when the output signal from the transmission control circuit 31 is unstable, the logical state inside the input/output circuit IO1 is determined. Moreover, backflow of current from the battery 20 to the cut-off control circuit 32 is prevented.

With the input/output circuit IO1 configured in this way, the interface of the transmission control circuit 31 with the outside is reliably blocked. Unstable input and output of signals between the transmission control circuit 31 and the device control unit 15 (external circuit) is prevented. When the interface of the transmission control circuit 31 with the outside is reliably blocked, the number of terminals used in the device control unit 15 can be reduced.

Second Embodiment

Figure 6:
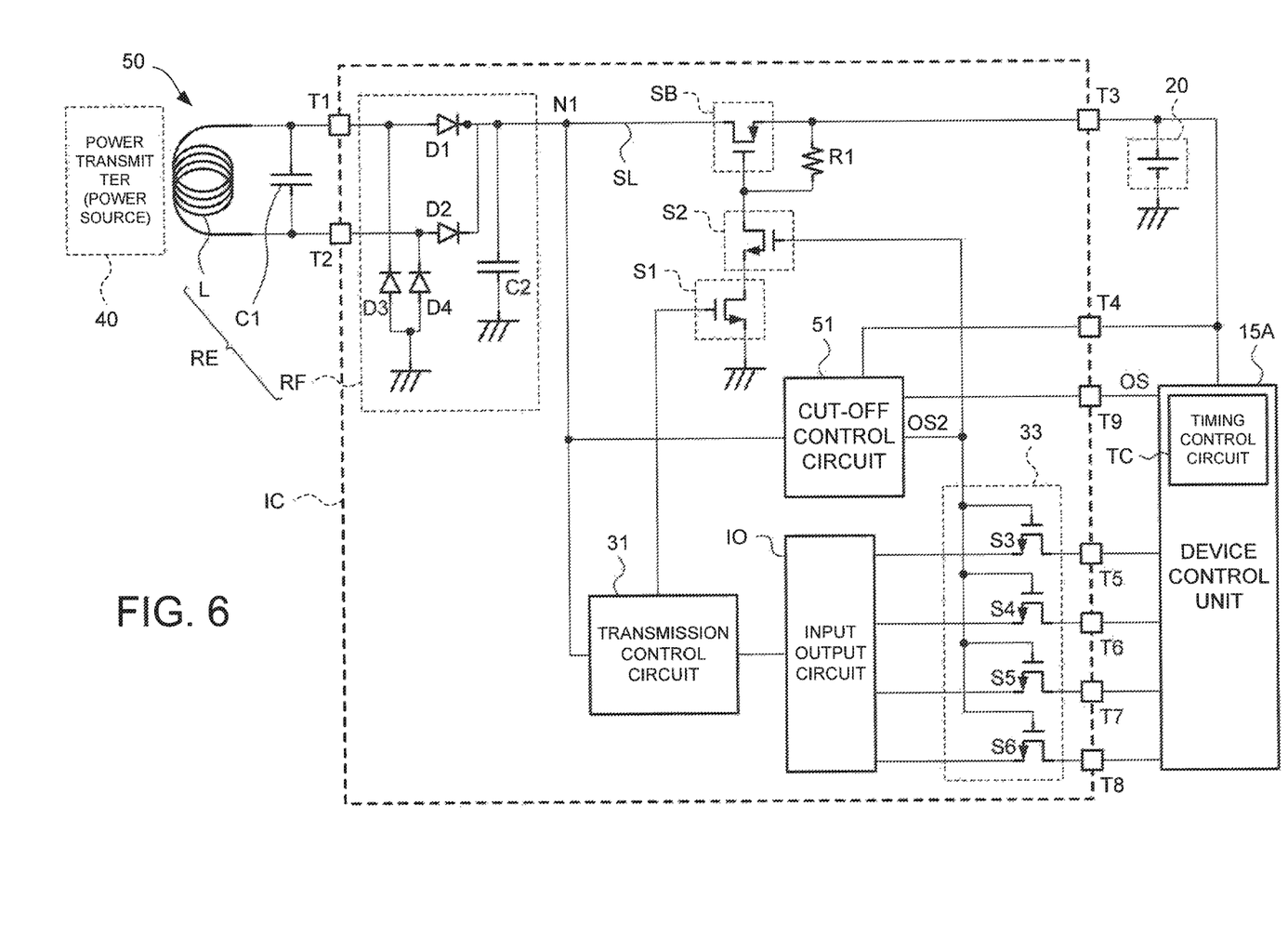
FIG. 6 is a circuit diagram illustrating a configuration of a power transmission device according to a second embodiment.

FIG. 6 is a circuit diagram illustrating a configuration of a power transmission device 50 according to a second embodiment. The power transmission device 50 is similar in configuration to the power transmission device 30 except the configuration of a cut-off control circuit 51. In the present embodiment, the cut-off control circuit 50 performs periodic (intermittent) switching control of the transmission cut-off switch SB on the basis of an intermittent operation command signal OS from a timing control circuit TC provided in a device control unit 15A (external circuit). For example, the timing control circuit TC has a timer, and supplies the intermittent operation command signal OS to the cut-off control circuit 51 on the basis of the timer.

In the present embodiment, the integrated circuit IC includes a control terminal T9 for intermittent operation, the control terminal T9 being connected to the timing control circuit TC (device control unit 15A). The cut-off control circuit 51 performs switching control of the control switch S2 on the basis of the input operating command signal OS. For example, the timing control circuit TC may be provided in a portion that is inside the electronic device 10 and outside the device control unit 15A.

Figure 7A:
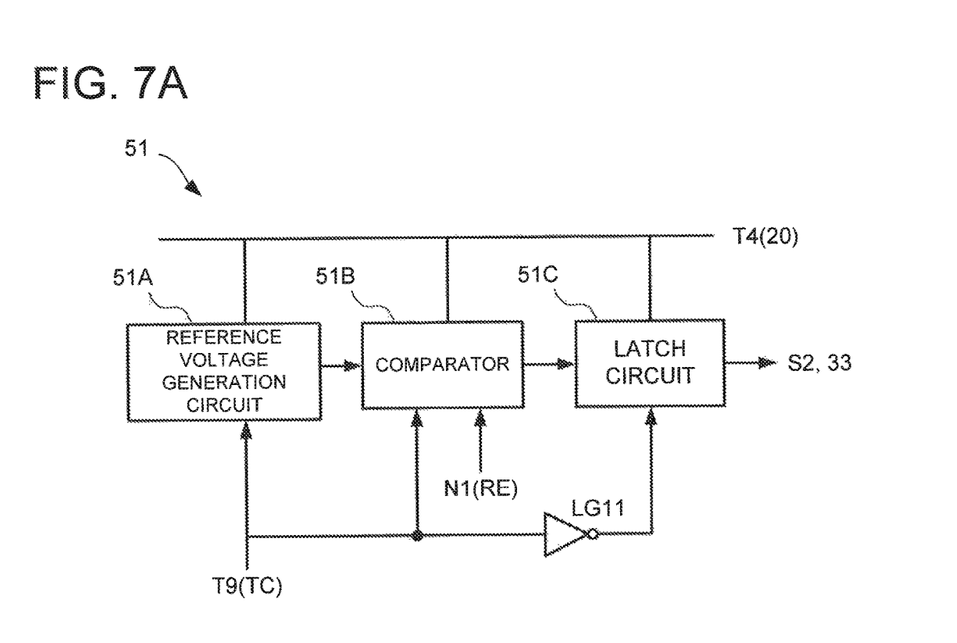
FIG. 7A is a block diagram illustrating a configuration of a cut-off control circuit of the power transmission device according to the second embodiment.
Figure 7B:
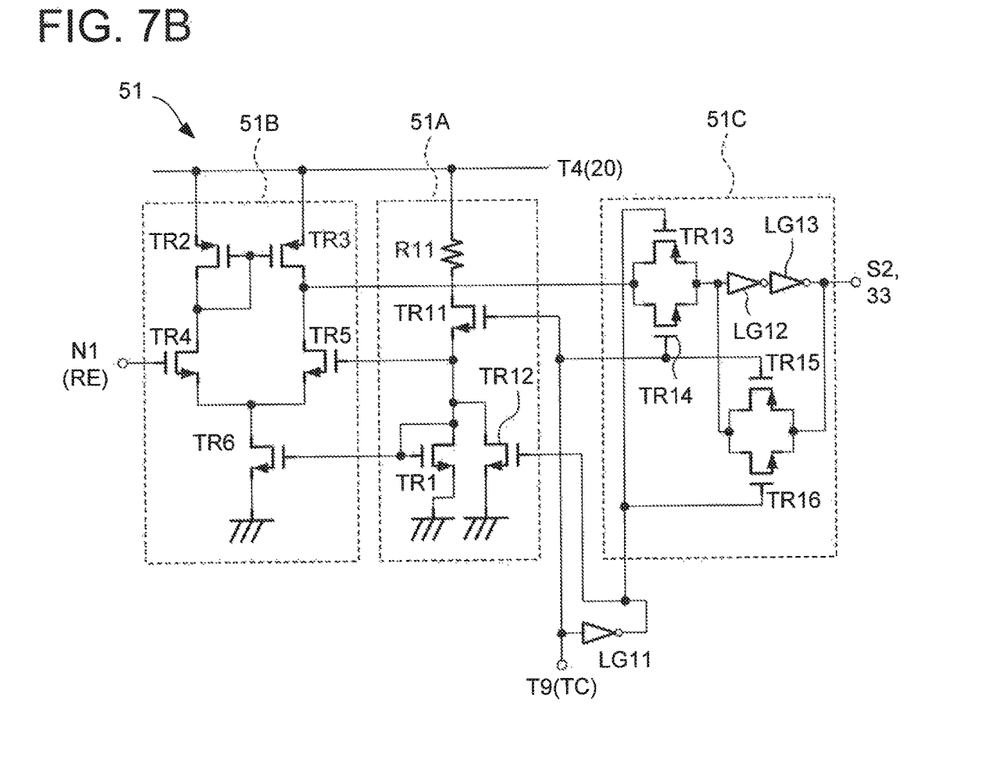
FIG. 7B is a circuit diagram illustrating an example of the configuration of the cut-off control circuit.

FIG. 7A is a block diagram illustrating the configuration of the cut-off control circuit 51. FIG. 7B is a circuit diagram illustrating an example of the configuration of the cut-off control circuit 51. In the present embodiment, the cut-off control circuit 51 is comprised of a reference voltage generation circuit 51A, a comparator 51B, and a latch circuit 51C. The intermittent operation command signal OS from the timing control circuit TC is supplied to the reference voltage generation circuit 51A and the comparator 51B, and is also supplied to the latch circuit 51C after being inverted in a NOT circuit LG11.

The reference voltage generation circuit 51A and the comparator 51B intermittently operate based on the control signal from the timing control circuit TC. For example, the reference voltage generation circuit 51A and the comparator 51B perform intermittent operation, whenever the intermittent operation command signal OS rises. The latch circuit 51C retains the output level of an output signal of the comparator 51B. The latch circuit 51C outputs as a control signal OS2 a signal retaining the output level of a latest output signal of the comparator 51B. The control switch S2 and the interface blocking circuit 33 operate on the basis of the output signal from the latch circuit 51C.

As illustrated in FIG. 7B, the reference voltage generation circuit 51A is configured by adding transistors TR11 and TR12 to the reference voltage generation circuit 32A. In the present embodiment, the transistor TR11 is an N-channel MOSFET connected between the resistor R11 and the transistor TR1. The transistor TR11 has a gate connected to an output terminal of the timing control circuit TC. In the present embodiment, the transistor TR12 is an N-channel MOSFET connected in parallel with the transistor TR1. The transistor TR12 has a gate connected to an output terminal of the NOT circuit LG11, and has a source being grounded.

The comparator 51B has the same configuration as the comparator 32B of the cut-off control circuit 32. The latch circuit 51C is comprised of transistors TR13, TR14, TR15, and TR16, and NOT circuits LG12 and LG13. In the present embodiment, the transistors TR13 and TR15 are each a P-channel MOSFET, and the transistors TR14 and TR16 are each an N-channel MOSFET.

In the present embodiment, the transistor TR13 has a drain connected to an output terminal of the comparator 51B and to a drain of the transistor 14. The transistor 13 has a gate connected to an output terminal of the NOT circuit LG11. The transistor TR13 has a source connected to an input terminal of the NOT circuit LG12. The transistor TR14 has a gate connected to an output terminal of the timing control circuit TC.

The transistor TR15 has a drain connected to a source of the transistor TR13 and a drain of the transistor TR16. The transistor TR15 has a gate connected to the output terminal of the timing control circuit TC. The NOT circuit LG12 has an output terminal connected to an input terminal of the NOT circuit LG13. The transistor TR16 has a gate connected to an output terminal of the NOT circuit LG11. The transistor TR15 has a source connected to a source of the transistor TR16 and an output terminal of the NOT circuit LG13. The output terminal of the NOT circuit LG13 is connected to the control switch S2 and the interface blocking circuit 33.

In the present embodiment, when the intermittent operation control signal is at a H level, a bias current flows to the reference voltage generation circuit 51A and the comparator 51B, which causes the reference voltage generation circuit 51A and the comparator 51B to perform their respective operation. When the intermittent operation control signal is at an L level, the bias current to the reference voltage generation circuit 51A is interrupted, so that the bias current does not flow to the comparator 51B. As a result, both the reference voltage generation circuit 51A and the comparator 51B stop operation. When the intermittent operation control signal is at the H level, the latch circuit 51C outputs the output of the comparator 51B as it is (supplies the output of the comparator 51B to the control switch S2 and the like). When the intermittent operation control signal is at the L level, input of the signal to the latch circuit 51C is interrupted, and the output level of the last output from the comparator 51B is retained (the last output is continuously output).

In the present embodiment, the cut-off control circuit 51 is configured to perform intermittent operation. Therefore, as compared with the case where the cut-off control circuit 51 operates at a constant basis, the operation can be performed with less power consumption.

Third Embodiment

Figure 8:
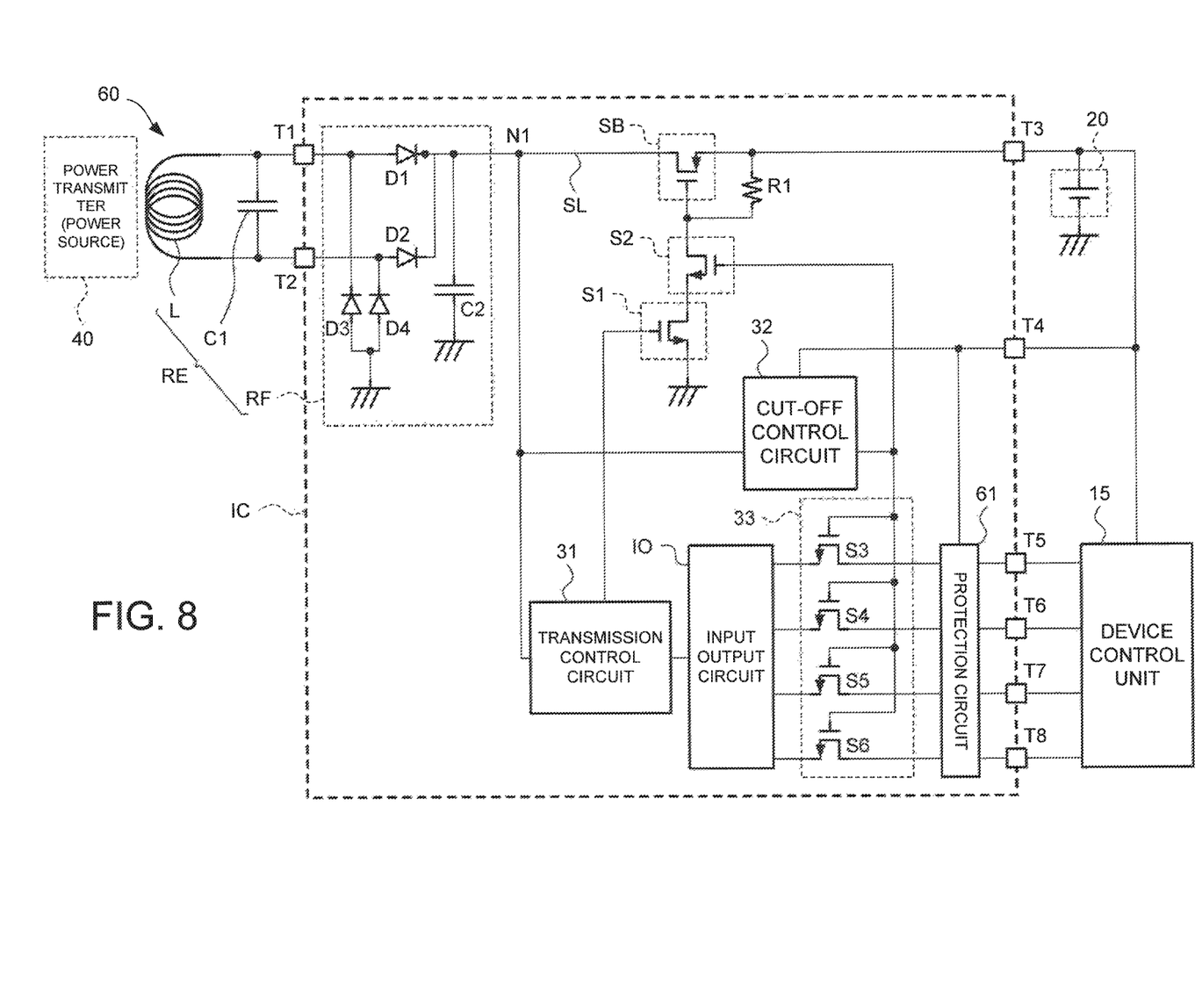
FIG. 8 is a circuit diagram illustrating a configuration of a power transmission device according to a third embodiment.

FIG. 8 is a circuit diagram illustrating a configuration of a power transmission device 60 according to a third embodiment. The power transmission device 60 is similar in configuration to the power transmission device 30 except that a protection circuit 61 is provided. The power transmission device 60 has the protection circuit 61 that protects internal elements (such as the transmission control circuit 31) of the integrated circuit IC from electrostatic discharge (ESD). In the present embodiment, the protection circuit 61 is provided between the interface terminals T5 to T8 and the input/output circuit IO. The protection circuit 61 is connected to the battery 20 via the power source terminal T4.

Figure 9:
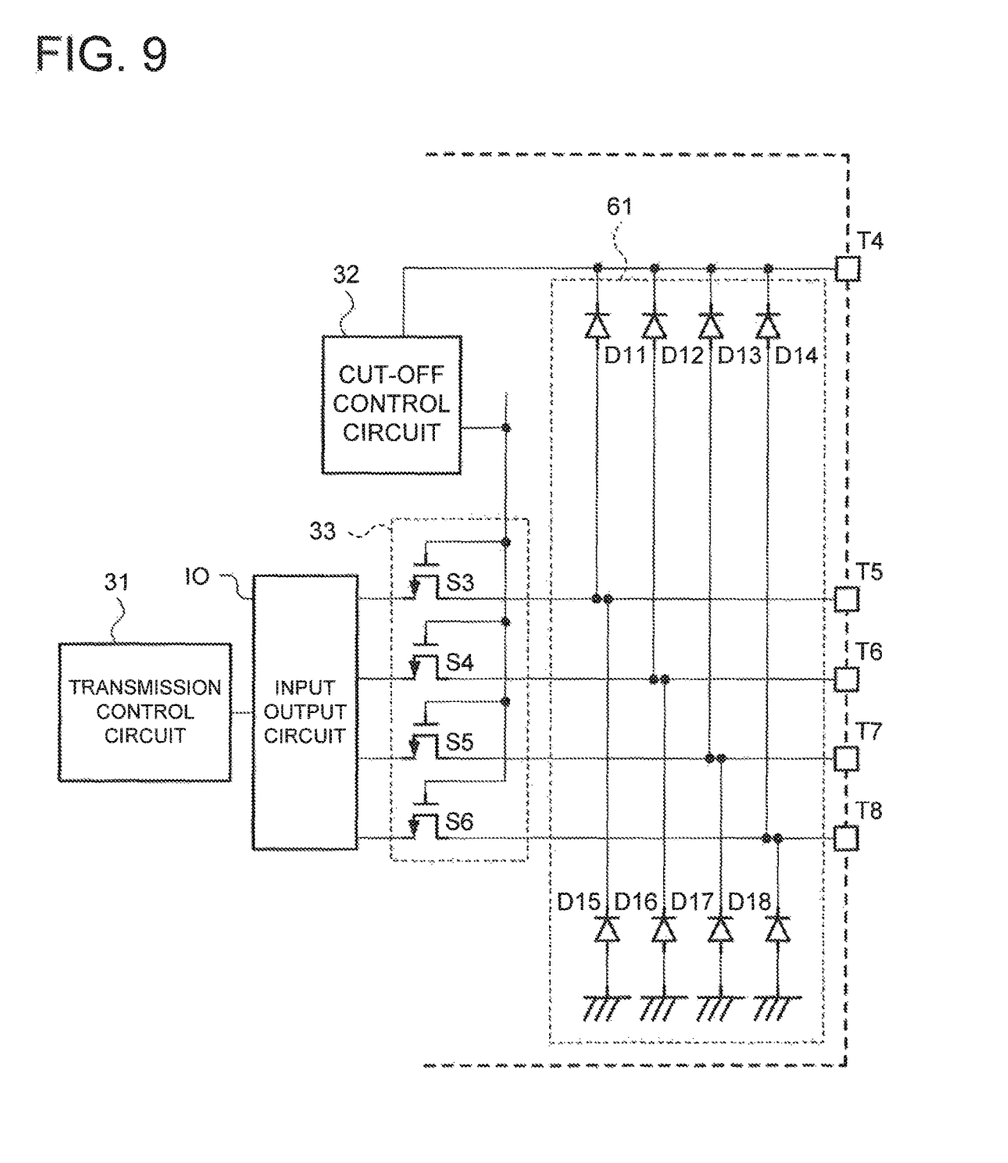
FIG. 9 is a circuit diagram illustrating a configuration of a protection circuit of the power transmission device according to the third embodiment.

FIG. 9 is a circuit diagram illustrating an example of the configuration of the protection circuit 61. As illustrated in FIG. 9, in the present embodiment, the protection circuit 61 is comprised of diodes D11 to D18 provided between interface terminals T5 to T8 and the interface blocking circuit 33 (interface blocking switches S3 to S6). The diodes D11 to D18 are configured to release the current generated in each of the interface terminals T5 to T8 to the battery 20 (power source terminal T4) side.

In the present embodiment, the protection circuit 61 protects the transmission control circuit 31 and the input/output circuit IO from ESD by receiving electric power supply from the battery 20. Therefore, even in the case where, for example, electric power is not received, the transmission control circuit 31 and the input/output circuit IO can reliably be protected from ESD.

In the description above, the power transmission devices 30, 50, and 60 have the power reception unit RE configured to perform power receiving operation upon reception of the AC magnetic field from the power transmitter 40. That is, the power transmission devices 30, 50, and 60 wirelessly feed electric power in the above description. However, the power reception unit RE may receive electric power from solar light, for example. In this case, the power reception unit includes a solar cell, for example. In other words, the disclosed configuration of the power reception unit RE is merely an example, and the power reception unit RE may have any configuration as long as it receives electric power from the outside.

In the description above, the power transmission device 30 (or 50, 60) has: the power transmission line SL that transmits electric power received with the power reception unit to the battery 20; the transmission cut-off switch SB that cuts off the power transmission line SL; the transmission control circuit 31 that operates by the received electric power from the power reception unit RE and switches conduction and non-conduction of the transmission cut-off switch SB on the basis of a battery state signal BS indicating a state of the battery 20; and the cut-off control circuit 32 (or 51) that monitors the received electric power from the power reception unit RE by receiving electric power supply from the battery 20, and forcibly puts the transmission cut-off switch SB in a non-conductive state when the received electric power is less than a specified value. Therefore, even in the case of receiving no electric power or in the case where the operation of the transmission control circuit 31 becomes unstable due to the state of power reception from the power reception unit RE, the transmission line SL can reliably be cut off. Therefore, useless power consumption due to such reasons as backflow of current from the battery 20 is prevented.

This application is based on a Japanese Patent application No. 2016-197287 which is hereby incorporated by reference.

What is claimed is:

1. A power transmission device, comprising:
   a power reception unit for receiving electric power from outside;
   a power transmission line for transmitting the electric power received with the power reception unit to a battery;
   a transmission cut-off switch for cutting off the power transmission line;
   a transmission control circuit configured to receive a battery state signal indicating a charging state of the battery and switch conduction and on-conduction of the transmission cut-off switch on a basis of the battery state signal;
   a cut-off control circuit connected to the power reception unit, and configured to monitor a magnitude of a received voltage transferred from the power reception unit to the power transmission line and to forcibly put the transmission cut-off switch in a non-conductive state when the magnitude of the received voltage is less than a specified value;
   a first control switch connected to the transmission control circuit and configured to switch conduction and non-conduction of the transmission cut-off switch; and
   a second control switch connected to the cut-off control circuit and configured to switch conduction and non-conduction of the transmission cut-off switch, the second control switch connecting between the transmission cut-off switch and the first control switch.

2. The power transmission device according to claim 1, comprising:
   an interface terminal for connecting the transmission control circuit and an external circuit; and
   an interface blocking switch for blocking between the transmission control circuit and the interface terminal, wherein
   the cut-off control circuit puts the interface blocking switch in a non-conductive state, when the magnitude of the received voltage is less than the specified voltage.

3. The power transmission device according to claim 1, wherein
   the cut-off control circuit includes a reference voltage generation circuit that generates a reference voltage equal to the specified voltage by receiving the electric power supply from the battery and a comparator that compares the reference voltage with the received voltage.

4. The power transmission device according to claim 3, wherein
   the reference voltage generation circuit and the comparator are configured to operate intermittently in response to an intermittent operation command signal, and
   the cut-off control circuit has a latch circuit that retains an output level of an output signal from the comparator.

5. The power transmission device according to claim 1, comprising
   a protection circuit provided between the transmission control circuit and the interface terminal, the protection circuit protecting the transmission control circuit from electrostatic discharge by receiving electric power supply from the battery.

6. The power transmission device according to claim 1, wherein
   the power reception unit has a coil and a capacitor that receives an alternating current magnetic field and converts the alternating current magnetic field into alternating current, and a rectifier circuit for converting the alternating current into a direct current voltage.

7. The power transmission device according to claim 1, comprising an integrated circuit configured from integration of the transmission cut-off switch, the transmission control circuit, and the cut-off control circuit.

* * * * *